United States Patent
Takahashi

Patent Number: 5,403,521
Date of Patent: Apr. 4, 1995

[54] BLOW SYSTEM AND A METHOD OF USE THEREFOR IN CONTROLLING THE QUALITY OF RECYCLE COOLING WATER IN A COOLING TOWER

[75] Inventor: Kunio Takahashi, Sagamihara, Japan

[73] Assignees: Aqua Unity Co., Ltd., Kanagawa; Nikkiso Eiko Co., Ltd., Tokyo, both of Japan

[21] Appl. No.: 144,020

[22] Filed: Nov. 1, 1993

[30] Foreign Application Priority Data

Nov. 2, 1992 [JP] Japan .................................. 4-294460
Nov. 2, 1992 [JP] Japan .................................. 4-294470

[51] Int. Cl.6 .............................................. B01F 3/04
[52] U.S. Cl. ...................................... 261/26; 261/111; 261/DIG. 46; 137/143; 137/947
[58] Field of Search ................. 261/DIG. 46, 26, 110, 261/111; 137/143, 147

[56] References Cited

U.S. PATENT DOCUMENTS

| | | | |
|---|---|---|---|
| 1,661,202 | 3/1928 | Thayer | 137/143 |
| 1,797,212 | 3/1931 | Kramer | 137/147 |
| 3,064,671 | 11/1962 | Petrusek | 137/147 |
| 3,311,141 | 3/1967 | Bell | 137/147 |
| 3,592,212 | 7/1971 | Schleimer et al. | 261/DIG. 46 |
| 3,788,340 | 1/1974 | O'Leavy et al. | 261/DIG. 46 |
| 3,918,469 | 11/1975 | Zamboni et al. | 261/DIG. 46 |
| 4,248,258 | 2/1981 | Devitt et al. | 137/147 |
| 4,361,522 | 11/1982 | Goettl | 261/DIG. 46 |
| 4,464,315 | 8/1984 | O'Leary | 261/DIG. 46 |
| 4,813,240 | 3/1989 | Hon | 261/DIG. 46 |

FOREIGN PATENT DOCUMENTS

750272  6/1956 United Kingdom ............... 137/143

Primary Examiner—Tim Miles
Attorney, Agent, or Firm—Larson and Taylor

[57] ABSTRACT

A water quality control method for recycling cooling water in a cooling tower equipped with a blow system and water treatment agent introduction means. Water is made up in response to the blow-down amount encountered by a blowing operation, and water treatment introduction means is actuated to introduce the water treatment agent into the recycle cooling water in the cooling tower, whereby the concentration of said agent in the recycle cooling water is retained at a desired level. The water treatment agent is made up by a predetermined amount, according to the amount of scattered water, at predetermined intervals of time during the operation of the arrangement. The water treatment introduction means is actuated after lapse of a fixed period of time, based on a predetermined level of the conductivity of the cooling water at the operational starting or cleaning of the cooling tower.

13 Claims, 2 Drawing Sheets

BLOW SYSTEM AND A METHOD OF USE THEREFOR IN CONTROLLING THE QUALITY OF RECYCLE COOLING WATER IN A COOLING TOWER

FIELD OF THE INVENTION

This invention relates to a method of controlling the quality of recycle cooling water in cooling towers provided with a blow system and means for introducing a water treatment agent.

BACKGROUND OF THE INVENTION

As generally known, the function of cooling towers is to bring cooling water into direct contact with air so as to evaporate water thereby cooling water by the latent heat. Since the cooling water is brought into direct contact with air the cooling towers have greater efficiency of heat transfer than in air cooling heat exchangers which transfer heat by raising only the temperature of air and, as a result, they are small-sized and less expensive to install. Thus, a variety of cooling towers ranging from large size to small size have hitherto been proposed to be launched in practical use for freezing and air conditioning.

Incidentally, as the problems which occur in administering a cooling tower there may be mentioned such troubles as corrosion, scale and sliming which take place in recycling cooling water system. Particularly, in an open type recycling cooling water system a part of the water evaporates in the cooling tower, so that the salts dissolved in the recyclying cooling water are concentrated in the recycle cooling water. On the other hand, calcium, silica and like existing, in the form of ions, in the recycle cooling water cause the generation of scale. These troubles not only lower the efficiency of heat exchange but also impair freezer, piping and the like. The measures taken to avoid such troubles are to effect a blow-down of discharging to the outside of the recycle cooling water a part of the recycling water to retain below a fixed value the contents of salts and other impurities in the recycling water, and to introduce chemicals such as anticorrosive, scale preventing agent and the like.

In the concentration administration of a recycling cooling water system by blow-down and the control by adding chemicals a system is usually adopted in which the conductivity of recycling water is measured, the concentration magnification of the recycling water is computed based on the measurement, and the amount of the blow water is automatically controlled. On the other hand, for the water treatment agents such as anticorrosive and scale preventing agent it is required always to retain a proper concentration in the recycling water, the amount of the water treatment agents introduced for the retention of the proper concentration is determined depending on the blow amount on the basis of the concentration set for retaining the chemicals, scattering loss amount, making-up water amount, etc., and the water treatment agent in an amount set by a chemical introducing apparatus is to be added for making-up the loss.

When water quality is controlled, particularly when chemicals such as anticorrosive, scale preventing agents and the like are introduced, the conductivity of the recycling water in the basin within the cooling tower is periodically computed, and the introducing amount of the chemicals is determined based on the computed data. However, considering that the loss of the recycling cooling water due to transpiration or the like varies depending on the operational condition of the equipment or on seasons, the chemicals must be retained usually above the lower limit concentration wherein they exhibit their effects. From the viewpoints of such retention and of controlling, the chemicals are added periodically (for example, several times a year) so that their concentration may be considerably higher than the concentration thereof in usual use. In this connection, the concentration of the water treatment agent in recycle cooling water is in a state far higher than the lower limit concentration wherein the chemicals demonstrate their effects, and this results in the use of the water treatment agent in a larger amount than practically required. This causes waste of comparatively expensive water treatment agent and an increase of running cost.

If the recycle cooling water transpires and the concentration of the chemicals reaches its upper limit as set, a sensor for conductivity senses said upper limit thereby to start blowing, while if the concentration becomes lower than a differential value smaller than the set upper limit the blowing is stopped. According to conventional methods, the adding quantity of the chemicals has been set irrespective of the blow amount whereas the chemicals in set amounts have been introduced by a pump of introducing an estimation amount irrespective of concentration. When the ambient air is lower in temperature the concentration of the chemicals is higher than a set value. However as the ambient temperature rises, transpiration of the cooling water is increased and thus the concentration of the chemicals is changed. Therefore, a person having knowledge or experience has so far determined the adding amount at the appropriate season. On the other hand, if there is no person who can manage such controlling, the pumping has generally been set on the basis of months of larger loading (transpiration), such as July and August.

Furthermore, in practical operation the cooling water is subject to recirculation or loading so that it cyclically evaporates and scatters from the cooling tower. The quantity of the scattering water varies depending on the profile of structure of the using cooling tower or on the installation place of the cooling tower or weather conditions (such that the installation place is under strong wind or likely to be exposed to strong wind). Therefore, if it is intended to add the water treatment agent proportionally to the blow amount as mentioned above, in the case of a cooling tower of comparatively greater scattering the concentration of the water treatment agent becomes insufficient when the blow amount is less.

Furthermore, conventionally, the initial introduction of the water treatment agent was carried out through human work at the time of starting to use or cleaning the cooling tower. This prevented the equipment from complete automation. Moreover, this kind of equipment is started for use almost at the same period (approximately April or May in Japan) each year, and it is necessary to effect cleaning or maintenance inspection or to initially introduce the water treatment agent at that period, and therefore it is difficult to secure working personnel thus leaving problems still to be solved.

SUMMARY OF THE INVENTION

To solve the forementioned problems the present invention aims at providing a method of controlling a water quality of recycle cooling water in cooling towers, according to which method it is possible to carry out, as a series of control operations, both the automatic blowing operation and chemical introducing operation which are separately carried out conventionally.

An object of the invention in a first aspect is to provide, while solving the aforementioned problems, a method of controlling a water quality of recycle cooling water in a cooling tower, in which method it is possible to prevent shortage in concentration of the water treatment agent, said shortage being caused by scattering of the water, and it is capable of retaining the concentration of the water treatment agent in the recycle cooling water always at a desired level irrespective of the structure of the cooling tower and under any operational environment.

Thus, another object of the invention is to provide, to solve the above problems, a water quality control method of the recycle cooling water in the cooling tower, in which method it is possible to automate the initial introduction of the water treatment agent at the starting time of use and the cleaning time, said introduction having been carried out conventionally through human work in cooling towers.

In order to achieve the aforementioned objects, the present invention in a first aspect, that is a water quality control method of the recycle cooling water in a cooling tower equipped with a blow system and means of adding a water treatment agent, comprises measuring the amount of a blow-down by the actuation of the blow means, making up the water in response to the blow-down amount thus measured, and operating the means of introducing the water treatment agent to introduce said agent into the recycle cooling water in the cooling tower whereby the concentration in said agent is retained at a desired level.

The blow-down amount is calculated preferably by computing the operational time of the blow system, and in proportion to the operational time thus computed, of the blow system, the adding amount of the water treatment agent is determined by the water treatment agent introduction means.

To carry out the method according to the invention, preferably, the blow system provided in the cooling tower comprises an inverted U-shape syphon pipe, one end of which is positioned in the recycle cooling water within the cooling tower and the other end is communicated with the outside of said tower so as to blow down the recycle cooling water to the outside of said tower, water supply means mounted to one end of said syphon pipe thereby to supply the recirculating cooling water in the cooling tower into said syphon pipe thus generating a syphon phenomenon, air supply means which supplies air into the top, bent section of said syphon pipe to stop the syphon phenomenon, and means for controlling the operations of said water supply means and said air supply means. The water treatment agent introduction means can be operated proportionally to the continual time of the syphoning from the operation initiation time of said water supply means by said control means to the operation initiation time of the air supply means.

In the present method in the first aspect, the blow-down amount is calculated by the operation of said blow system, and the water treatment agent is added into the recycle cooling water in the cooling tower in response to the blow-down amount thus measured, so that it is capable of carrying out, as a series of water controlling operations, both the blow-down operation and the introducing operation of the water treatment agent, and it is capable of setting the adding quantity of said agent by said introduction means proportionally to the measured operational time of the blow system. Thus, it is unnecessary to introduce the water treatment agent in excess as done in the past while always retaining approximately constant concentration of the water treatment agent.

According to the present invention in a second aspect, there is provided a method of controlling a water quality of the recycle cooling water in a cooling tower equipped with a blow system and means for introducing a water treatment agent, in which method the blow-down amount is calculated by the blow means, the cooling water is made up correspondingly to the blow-down amount thus calculated, and the means for introducing the water treatment agent is actuated to introduce said agent into the recycling cooling water in the cooling tower. On the other hand, separately from the proportional introduction of the water treatment agent in response to the blow-down amount, said agent is made up by the predetermined amount correspondingly to the amount of the scattered water at predetermined time intervals during the operation of the arrangement thus maintaining a constant concentration of the water treatment agent in the recirculating cooling water always at a desired level.

In the present method according to the second aspect, separately from the proportional introduction of the water treatment agent in response to the blow-down amount, the water treatment agent is replenished by a predetermined amount corresponding to the amount of the scattered water at predetermined intervals during the operation of the arrangement whereby the water treatment agent can be made up by the scattered proportion while the concentration of the water treatment agent in the recycle cooling water can be certainly retained always at a desired level.

Furthermore, according to the present invention in a third aspect, there is provided a method of controlling the quality of the recycle cooling water in a cooling tower, in which method the blow-down amount is computed by the actuation of a blow system, the cooling water is replenished in accordance with the blow-down amount thus computed, and the means for introducing the water treatment agent is actuated to introduce said agent into the recycle cooling water in the cooling tower. On the other hand, separately from the proportional introduction of the water treatment agent according to the blow-down amount, said agent is made up by a predetermined amount in response to the scattered amount at predetermined time intervals when the conductivity of the cooling water during the operation is higher than that of the water treatment agent at the time of initial introduction thus retaining the concentration of the agent always at a desired level.

Moreover, in the present invention according to the third aspect, the water treatment agent is made up for the scattered water only when the conductivity of the cooling water is higher than that of the water treatment agent at the time of initial introduction whereby it is able to retain the concentration of the water treatment agent in the recycle cooling water more accurately at a desired level.

Furthermore, according to the invention in a fourth aspect, i.e., a water quality control method of the recycling cooling water in a cooling tower provided with a blow system and means for introducing a water treatment agent, the means for introducing the water treatment agent is actuated after lapse of a certain period of time from the time of having detected the change from a first predetermined electric conductivity of the cooling water at the starting time of use of the cooling tower or at the cleaning time of said tower to a second predetermined electric conductivity, higher than the first conductivity whereby a fixed amount of the water treatment agent is introduced one time, as an initial introduction, into the recirculating cooling water in the cooling tower.

The time interval from the one-time initial introduction of a fixed amount of the water treatment agent to the next initial introduction of the same can be set longer than said fixed time.

The initial introduction quantity of the water treatment agent is determined by setting the operational time of the water treatment agent introduction means in respect of the holding water quantity.

The conductivity is 0 $\mu$S/cm in absence of the cooling water in the cooling tower, it is mostly 200 $\mu$S/cm with the water replenished by city water, and it is mostly about 300 $\mu$S/cm with the well water in the vicinity of Tokyo. The first electric conductivity of the cooling water is set, for example, to 200 $\mu$S/cm when the cooling tower has been washed or when the cooling water has been supplemented without washing the cooling tower, while the second electric conductivity is set, for example, to 300 $\mu$S/cm. Then, the time is computed starting from the time when the value detected by a conduction rate detector has changed from 200 $\mu$S/cm to be the first conductivity to 300 $\mu$S/cm to be the second conductivity, and after lapse of a fixed period of time (such as about 24 hours) the water treatment agent introduction means is actuated to subject said water treatment agent to a single automatic initial introduction thereof. The next initial introduction is made to be effected after an optional period of time (such as about 240 hours) longer than said fixed period of time. This enables the initial introduction of the water treatment agent to be automated. It is further possible to optimize the cycle of initially adding the water treatment agent as well as to avoid the initial introduction doubled within a predetermined period.

BRIEF DESCRIPTION OF THE DRAWINGS

The invention will now be described more in detail, by way of embodiments, with reference to the accompanying drawings, wherein.

DETAILED DESCRIPTION

Figure 1:
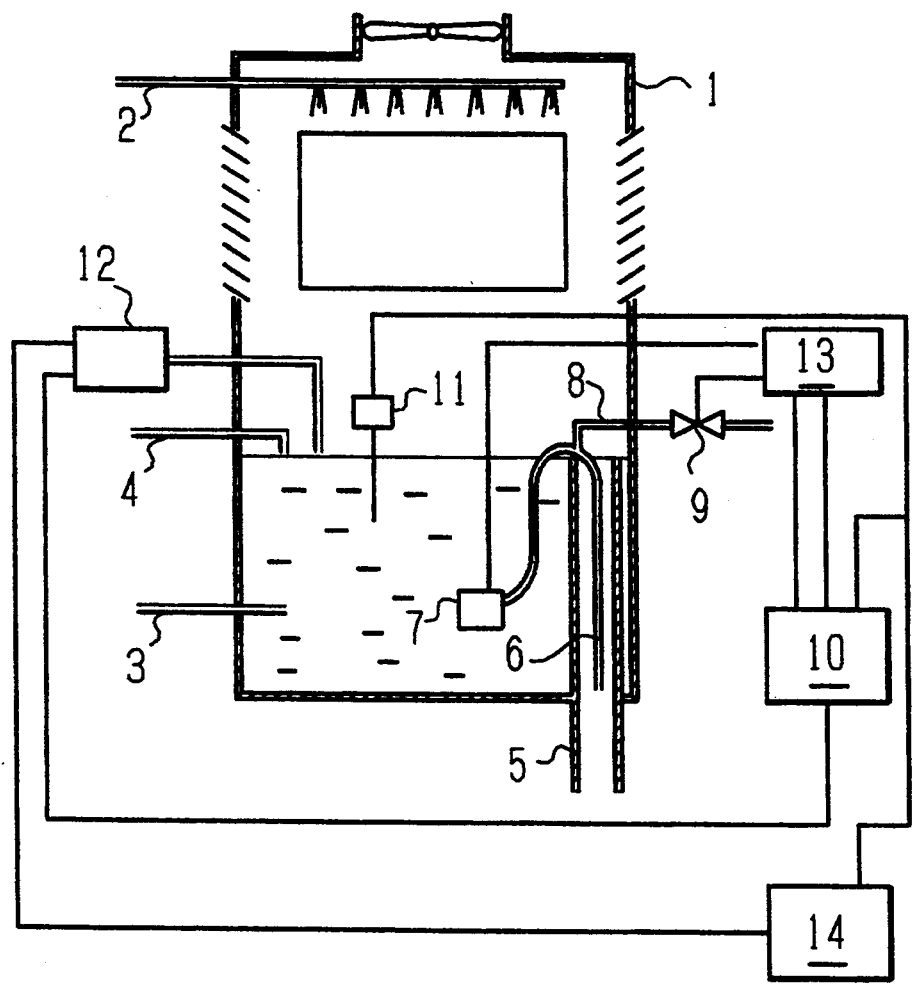
FIG. 1 is a schematic, diagrammatic view showing one example of a cooling tower in which the method of controlling the water quality of recycle cooling water in the cooling tower is carried out according to a first embodiment of the invention.

Referring now more particularly to FIG. 1 showing an example of a cooling tower and a water quality control arrangement, wherein the present method according to a first embodiment is carried out, conduits 2, 3 and a water supplementing pipe 4 of the cooling water are connected to a cooling tower 1. An overflow pipe 5 is arranged in the water basin below the cooling tower 1, and a reversed U-shaped syphon pipe 6 constituting a blow system is mounted bridging the upper end of said overflow pipe 5. One end of the syphon pipe 6 is provided with water supply means 7 constituted by a pump which feeds the cooling water in the lower basin to the syphon pipe 6 to allow a syphon phenomenon to be generated, whereas the other end thereof extends into the overflow pipe 5. The bent top of the syphon pipe 6 communicates with an air supply pipe 8 which feeds air to cease the syphon phenomenon, and the pipe 8 is provided with a suitable type switching valve 9. The switching valve 9 in said water supply means 7 and said air supply pipe 8 is connected to means 10 for controlling the blow action so as to control the blow operation by the syphon pipe 6. The conductivity of the cooling water is detected by a detector 11, and the signal indicating the conductivity detected by the detector 11 is fed to the means 10 for controlling the blow action. The water treatment agent such as anticorrosive or scale prevention agent is introduced into the cooling water by means 12 for melting the water treatment agent, and said means 12 is controlled by the blow action control means 10. The reference numeral 13 designates a timer for setting the blow time which computes the continual time of syphoning i.e. the blow time from the operation starting time of actuating the water supply means 7 to the time of opening of the switching valve 9. The blow time signal computed by the timer 13 is fed to the blow action control means 10, and it is employed to control the operation of the means 12 for introducing the water treatment agent in proportion to the blow time calculated.

Again referring to FIG. 1, the signal which indicates the conductivity detected by the detector 11 is fed to means 14 for determining the requiring compensation for the scattered water. Said means 14 actuates the water treatment agent introduction means 12 for a predetermined period of time at fixed time intervals only when the conductivity detected by the detector 11 is higher than that of the cooling water at initial introduction of water treatment agent, so that the water treatment agent in a predetermined amount is made up in the cooling water. In that case, considering of the shape of the cooling tower 1 to be used and the ambient weather conditions, the amount of the scattering water is calculated, and on the basis of the amount thus calculated the frequency of the making-up actions or the making-up amount can be set by the means 14 for determining the required compensation for the scattered water.

Though not shown, it is possible to use the same electric supply such as solar battery, as the electric supply common for the respective elements constituting the blow means, the water treatment introduction means, the timer, and the respective operation control means, and in the case of utilizing a solar battery as an electric supply it is possible to carry out the present method without requiring specific electric wiring to the existing cooling tower.

The invention will then be described with reference to an operation of controlling the cooling water in practice by using the cooling arrangement thus constructed.

Referring to the proportional introduction action of the water treatment agent, a blow start control signal is fed from the blow action control means 10 to the water supply means 7 of said blow means according to the neccessary blow amount pre-set based on the conductivity of the cooling water, which is detected by the detector 11, when the water supply means 7 is actuated, and the cooling water in the lower water basin is fed into the syphon pipe 6 to initiate syphoning. In such case, as soon as syphoning begins the water supply means 7 is stopped. Thus, when the cooling water is started for blowing via the syphon pipe 6 and the blow reaches a predetermined quantity, the switching valve 9 of the air supply pipe 8 is released from the blow action control means 10 by a blow finish control signal, air is supplied into the syphon pipe 6 via the air supply pipe 8, and syphoning ceases, thus terminating the blow operation. During this operation, timer 13 calculates the practical blow time, and the blow time is transmitted to the blow action control means 10. In this means 10, a water treatment introduction command signal is fed to the water treatment introduction means 12 in response to the blow time practically computed, and said means 12 is actuated thereby to add into the cooling water the water treatment agent proportionately to the blow time practically computed. In such case, the continual discharge quantity of the water treatment agent can be set in such a manner that the concentration in the cooling water of the cooling water piping is higher than the lower limit, for example, 200 PPM, wherein the effects of the chemicals are demonstrated. Additionally, a required amount of the make-up water is supplied through the water supplementing pipe 4 according naturally to the blow amount.

Then, referring to the action of making up the scattered water, means 14 for controlling the action of supplementing the scattered water is actuated only when the conductivity detected by the detector 11 is higher than that of the cooling water at initial introduction of the water treatment agent. In said means 14, the quantity of the water treatment agent to be made up is previously set like 10%, 20% and 30% in accordance with the amount of scattering water during the operation, which amount is computed based on the shape of the using cooling tower and the weather conditions (such as constant blowing of comparatively strong wind). Thus, the means 14 for determining the required compensation for the scattered water feeds an action signal to the water treatment agent introduction means 12, the action signal corresponding to the set amount of the water treatment agent to be compensated. In this connection, the introduction means 14 for the water treatment agent makes up a set amount of the water treatment agent into the cooling water at predetermined time intervals.

In the embodiment illustrated in FIG. 1, the water treatment agent is supplementally added only when the conductivity detected by the detector 11 is higher than that of the cooling water at initial introduction of the water treatment agent. However, it may also be all right to supplementally add it correspondingly to the scattering water amount irrespective of the conductivity of the cooling water at its initial introduction.

Furthermore, in the aforementioned embodiment, the introduction of the water treatment agent is to be set proportionally to the practical blow time. Instead, however, the action may also be controlled in such a manner that the practical blow flow of the cooling water is calculated, for example, by an integrating flow meter, the action of the water treatment introduction means 12 is controlled in proportion to the blow flow thus calculated, and a required amount of the water treatment agent is added.

Though in FIG. 1 the embodiment is illustrated such that the water treatment agent is introduced into the lower water basin, it is naturally possible to introduce the agent to the circuits of the cooling water.

Figure 2:
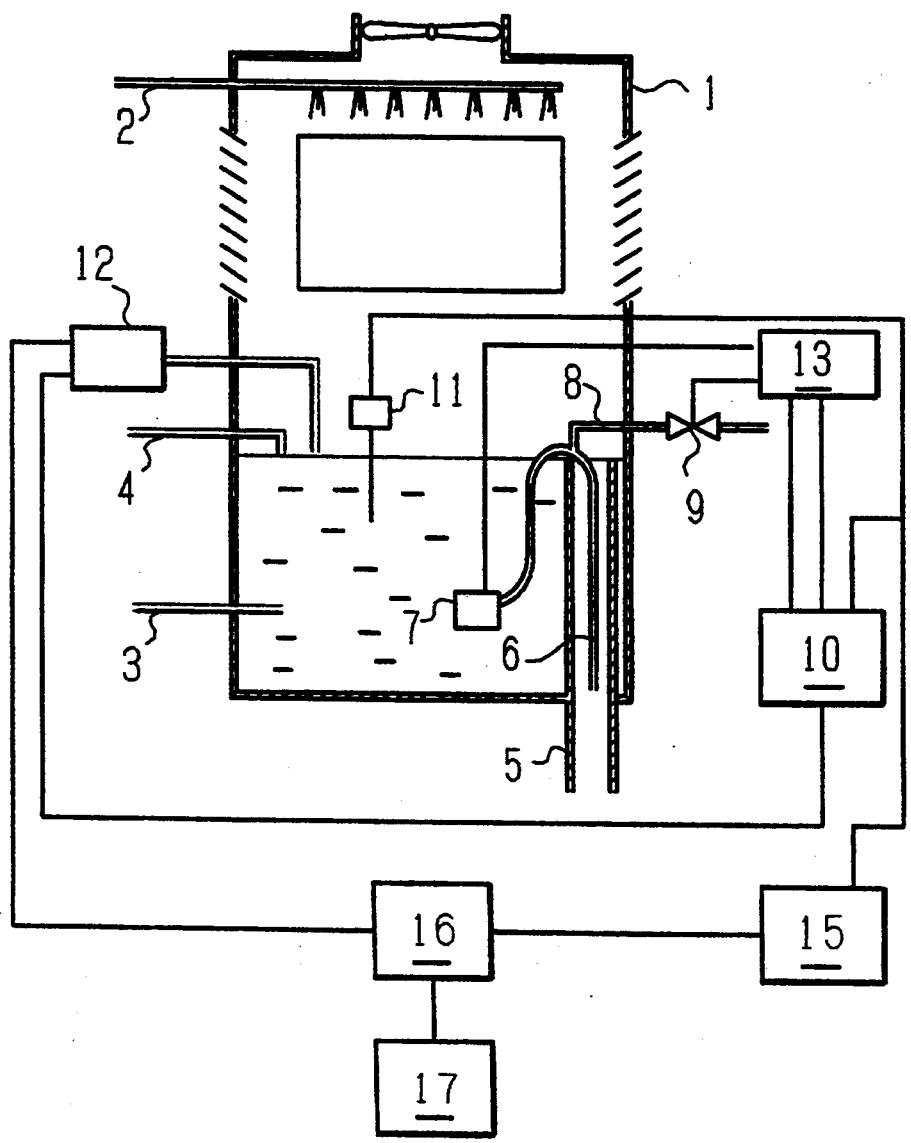
FIG. 2 is a schematic, diagrammatic view showing one example of a cooling tower in which the method of controlling the water quality of recycle cooling water in the cooling tower is carried out according to a second embodiment of the invention.

FIG. 2 illustrates another embodiment of the invention. With regard to the members corresponding to those of the first embodiment shown in FIG. 1, they are shown with the same reference numerals.

In the second embodiment shown in FIG. 2, the reference numeral 15 indicates means for controlling the initial introduction action of the water treatment agent, and it is fed with a signal indicating the conductivity detected by the detector 11. Said means 15 is connected to the water treatment agent introduction means 12 via a timer 16 for setting the initial introduction time and the initial introduction amount and via another timer 17 for setting the initial introduction cycle whereby the initial introduction of the water treatment agent by the water treatment introduction means 12 is controlled based on the signal indicating the conductivity transmitted from the detector 11.

That is, in the means 15 for controlling the action of the initial introduction, if the signal indicating the conductivity of the cooling water, which is fed from the detector 11, changes at the using start or cleaning of the cooling tower 1 from the first level of, for example, 200 $\mu S/cm$ to the second level of, for example, 300 $\mu S/cm$, an action control output signal is generated to the timer 16 for setting the initial introduction time and the initial introduction amount thereby to actuate the timer 16. This timer 16 functions to operate the water treatment introduction means 12 for a predetermined period of time, after lapse of a predetermined period of time (which can be optionally set, but which may be, for example, about 24 hours since one day is usually spent to clean the cooling tower) since the starting thereof by the action control output signal fed from the initial introduction control means 15. Simultaneously, the timer 17 for setting the intial introduction cycle is actuated, too. This timer 17 acts to obstruct the initial introduction operation made by the timer 16 for a predetermined period of time (for example, 240 hours though the time can be optionally set while considering of the operational state or condition of the arrangement) from the intial introduction of said water treatment agent. Then, after lapse of a predetermined period of time set by the timer 17 the timer 16 becomes again possible to be operable.

Though not shown, even in the second embodiment, it is possible to use the same electric supply such as solar battery, as the electric supply common for the respective elements constituting a blow system, the water treatment introduction means, the respective timers, and the respective operation control means, and in the case of utilizing a solar battery as a drive electric supply it is possible to carry out the present method without requiring specific electric wiring to the existing cooling tower.

Now, an explanation will be made in respect of the operation of practically controlling the cooling water by using the arrangement thus constructed. When a cooling operation is started, usually the cooling tower 1 is washed or it is filled with water without washing. At this time, the conductivity of the cooling water is about 200 $\mu S/cm$, but at the starting of operation the conductivity increases. If the conductivity is detected by the detector 11 and if it changes from the first level of about 200 $\mu S/cm$ to the second level of 300 $\mu S/cm$ higher than the first level, the initial introduction action control means 15 feeds the output signal to the timer 16 for setting the initial introduction time and the initial introduction amount thus actuating the timer 16. After lapse of previously set 24 hours, said timer 16 actuates the water treatment agent adding means 12 for a predetermined period of time to introduce a predetermined amount of the water treatment agent into the recycling cooling water in the cooling tower. After the finish of the initial introduction operation, even if the water of the cooling tower is withdrawn after the finish of cooling and the conductivity detected by the detector 11 were 300, 200 or 0 μS/cm, the initial introduction is not effected again due to the action of the timer 17 for setting the initial introduction cycle unless the set initial introduction cycle period (240 hours) lapses.

On the other hand, after the starting of operation, the control is made such that the water treatment introduction means 12 is actuated by means of the action control means 10 in response to the required blow amount set in advance on the basis of the conductivity of the cooling water detected by the detector 11 thereby to introduce into the cooling water the water treatment agent proportionate to the blow time practically computed while retaining the enrichment responsive to the loading and the concentration of the water treatment agent.

As described above, the present invention is constituted such that the blow-down amount is calculated by means of the blow system, and the water treatment agent is added into the recycle cooling water in the cooling tower in response to the blow-down amount thus calculated, and therefore it is capable of adding the chemicals proportionately to the blow amount after the blowing operation thereby resulting in constant concentration of the chemicals in the cooling water. Thus, compared with the conventional methods wherein blowing operation and chemical introducing operation are separately carried out, it is possible to maintain constant concentration of a fixed amount of chemicals even at less operational loading. As the loading increases the blowing amount also increases, but even in that case the water treatment agent need not be wastefully used. This largely reduces the total use amount of the water treatment agent through each year thus expecting a large reduction of the running cost of the arrangement. Unlike the known methods, the present method does not carry out the blowing operation and the chemical introduction operation separately, so that it is possible to greatly simplify the water control even in the case of employing apparatuses for automatic blowing and chemical introduction.

Furthermore, the present invention is constituted such that the blow-down amount is calculated by means of the blow system, the water treatment agent is added into the recycling cooling water in the cooling tower in response to the blow-down amount thus calculated, and said agent is made up in response to the amount of the scattered water. It is therefore possible to automatically make up the water treatment agent escaped from the scattered water thereby to keep the concentration of the chemicals in the cooling water substantially constant and to completely automate the water quality control of the recycling cooling water in the cooling tower. This leads to a large reduction of the total consumption of the water treatment agent through each year and to a sharp simplification of the water control thus expecting a large reduction of the running cost of the arrangement.

Furthermore, according to the present method, it is possible to automatically introduce the water treatment agent after a certain period of time for starting the operation of the cooling tower or cleaning the tower, and after this initial introduction of the agent it is possible to prevent the agent from initial re-introduction before lapse of a predetermined period of time even if the conductivity of the cooling water lowered to a level of an initial introduction. As a result, not limited to elimination of labor, it saves a user trouble of effecting the initial introduction through human work while answering the user's convenience, the working does not concentrate at a specific time (usually the time of starting the cooling operation), and it is possible to level the maintenance and inspection working of this kind of arrangement through the year.

Additionally, as proposed above, by combining the present method with a chemical introduction control proportionate to the blow amount during the cooling operation it is capable of completely automating the water quality control of the recycle cooling water in the cooling tower. This results in a sharp reduction of the total consumption of the water treatment agent through each year, a large-scale simplification of water controlling and a large reduction of the running cost of the arrangement.

I claim:

1. A method of controlling quality of recycle cooling water in a cooling tower equipped with a blow system and water treatment agent introduction means, comprising the steps of: calculating the blow-down amount by the action of the blow system, said blow system comprising an inverted U-shaped syphon pipe, one end of said pipe being positioned in the recycle cooling water within the cooling tower and the other end of said pipe being in communication with the outside of said tower so as to blow down the recycle cooling water to the outside of said tower, said blow system further comprising water supply means mounted to one end of said syphon pipe to supply the recirculating cooling water in the cooling tower into said syphon pipe thus generating a syphon, air supply means which supplies air into the top, bent section of said syphon pipe to stop the syphon, and means for controlling the operations of said water supply means and said air supply means, the water treatment agent introduction means being operable in proportion to the continual time of the syphon from the operation initiation time of said water supply means by said control means to the operation initiation time of the air supply means, adding make-up water to the cooling water in response to the blow-down amount thus calculated, and actuating the water treatment introduction means to introduce a water treatment agent into the recycle cooling water in the cooling tower, while retaining the concentration of the water treatment agent in the recycle cooling water at a desired level.

2. A water quality control method according to claim 1, wherein said step of calculating comprises computing the working time of the blow system, and said step of actuating comprises setting the water treatment agent introduction means to introduce an amount of the water treatment agent proportional to the working time of the blow system.

3. A method of controlling quality of recycle cooling water in a cooling tower equipped with a blow system and a water treatment agent introduction means, comprising the steps of:

calculating the blow-down amount by the blow system, adding make-up water to the cooling water in response to the blow-down amount thus calculated, actuating the water treatment introduction means by control means responsive to conductivity of the cooling water to introduce the water treatment agent into the recycle cooling water in the cooling tower, and making up the water treatment agent, by a predetermined amount, according to the scattered water amount, at predetermined time intervals during the operation of the arrangement, said step of making up being separate from the proportional introduction of the water treatment agent responding to the blow-down amount for retaining the concentration of the water treatment agent at a desired level.

4. A method of controlling quality of recycle cooling water in a cooling tower equipped with a blow system and water treatment agent introduction means, comprising the steps of:

calculating the blow-down amount by the blow system, adding make-up water to the cooling water in response to the blow-down amount thus calculated, actuating the water treatment introduction means by control means responsive to conductivity of the cooling water to introduce the water treatment agent into the recycling cooling water in the cooling tower, and making up the water treatment agent, by a predetermined amount, according to the scattered water amount, at predetermined time intervals, when the conductivity of the cooling water is higher than that of the cooling water at its initial introduction during the operation of the arrangement, said step of making up being separate from the proportional introduction of the water treatment agent responding to the blow-down amount for retaining the concentration of the water treatment agent at a desired level.

5. A method of controlling a water quality of recycle cooling water in a cooling tower equipped with a blow system and water treatment agent introduction means, comprising the steps of:

actuating the water treatment agent introduction means after a lapse of a certain time from the time of having detected the change from a first predetermined electric conductivity of the cooling water at the starting time of operation of the cooling tower or at the cleaning time of said tower to a second predetermined electric conductivity higher than the first conductivity whereby a fixed amount of the water treatment agent is introduced one time, as an initial introduction, into the recycle cooling water in the cooling tower.

6. A water control method according to claim 5, wherein the time interval from the initial introduction of a predetermined amount of the water treatment agent to a next initial introduction of a predetermined amount of said agent, is set longer than the aforementioned fixed period of time.

7. A blow system comprising:

an inverse U-shaped syphon pipe, one end of which is submerged in water of a water basin to blow the water to the outside of the basin, water supply means which supplies water into the syphon pipe through said one end of the syphon pipe to initiate syphoning, air supply means which supplies air to the top section of said syphon pipe to terminate syphoning, drive control means which drives said water supply means for a predetermined time period by an initial electric signal to initiate syphoning and drives said air supply means by a final electric signal to terminate syphoning, and a power supply for said drive control means.

8. A blow system according to claim 7, wherein the water supply means is a submersible pump submerged in the water of the water basin.

9. A blow system according to claim 7, wherein the air supply means is an electromagnetic valve which opens or closes an air introduction pipe communicating with the inside of the top of said syphon pipe.

10. A blow system according to claim 7, wherein the drive control means is controlled by an electric signal transmitted via a detector which detects conductivity of the water in the water basin.

11. A blow system according to claim 7, wherein the drive control means is controlled by an electric signal transmitted via a timer which is operable at a fixed time of a fixed day.

12. A blow system according to claim 7, wherein the power supply is a storage battery with a solar cell.

13. A blow system according to claim 7, wherein the power supply is a storage battery or a dry battery.

* * * * *